E. SCHNEIDER.
GUN MOUNTED ON WHEELED CARRIAGES.
APPLICATION FILED JULY 20, 1920.

1,358,658.

Patented Nov. 9, 1920.
2 SHEETS—SHEET 1.

Inventor,
Eugene Schneider.
By
Mauro, Cameron, Lewis & Kerkam
Attorneys

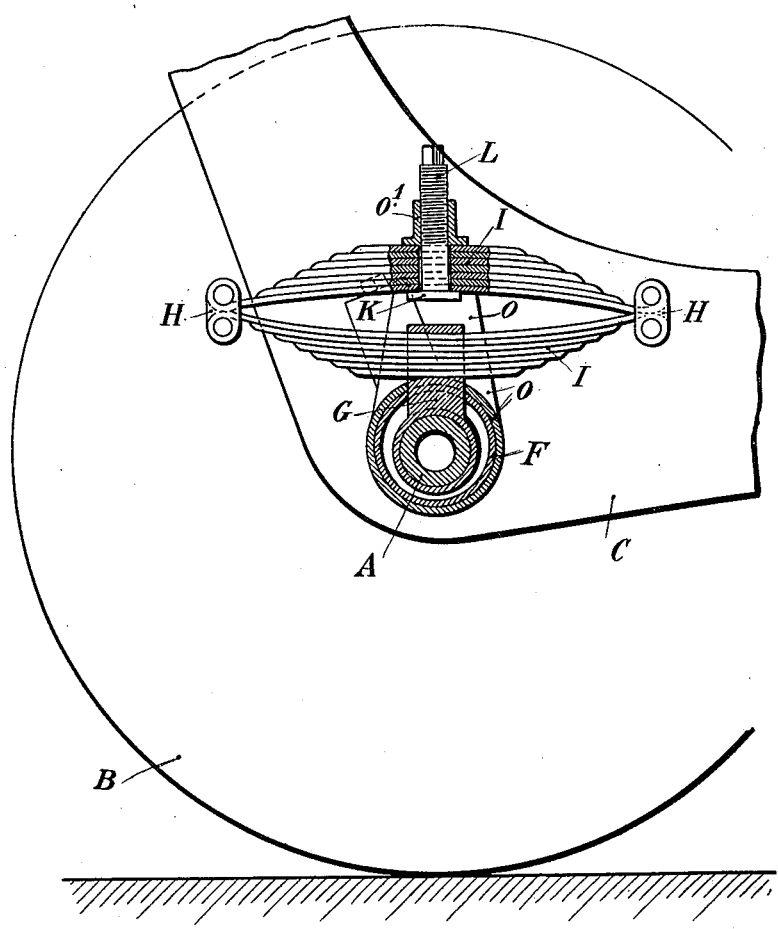

UNITED STATES PATENT OFFICE.

EUGENE SCHNEIDER, OF PARIS, FRANCE, ASSIGNOR TO SCHNEIDER & CIE., OF PARIS, FRANCE, A LIMITED JOINT-STOCK COMPANY OF FRANCE.

GUN MOUNTED ON WHEELED CARRIAGES.

1,358,658. Specification of Letters Patent. Patented Nov. 9, 1920.

Original application filed October 24, 1919, Serial No. 333,101. Divided and this application filed July 20, 1920. Serial No. 397,632.

*To all whom it may concern:*

Be it known that I, EUGENE SCHNEIDER, a citizen of the Republic of France, and a resident of Paris, France, have invented new and useful Improvements in Guns Mounted on Wheeled Carriages, which invention is fully set forth in the following specification.

Wheeled gun carriages are known which are so constructed as to provide a limited range of lateral movement on the axle between the supporting wheels for the purpose of varying the training of the gun. In such carriages, the lateral movement is obtained by the operation of a screw journaled in the carriage and working in a nut fixed to the wheeled axle to slide the carriage along the same in either direction.

According to the present invention, the head of the gun carriage, instead of sliding upon the wheeled axle, is slidably mounted on an auxiliary or false axle that is vertically movable in relation to the main or wheeled axle, the auxiliary axle being elastically suspended from the main axle by interposed springs that are utilized for transport purposes. In this instance, the auxiliary axle comprises a tubular sleeve mounted on the main axle, the interior diameter of the tubular sleeve being considerably greater than the exterior diameter of the main axle so that the auxiliary axle can move vertically relatively to the main axle. Means are provided for relieving the springs of the load and for connecting the auxiliary axle directly with the main axle to form a rigid bearing between the two axles so that the shock of discharge will be transmitted directly from the carriage to the main axle during firing without the interposition of the springs.

In my copending application filed October 24, 1919, Serial No. 333,101, several constructional forms of this invention are disclosed, and the present application is a division of the earlier application, being directed to one of the constructional forms therein shown and described.

In the accompanying drawings, in which similar reference characters designate corresponding parts—

Fig. 2 is a sectional view on the line 2—2 of Fig. 1.

Figure 1:
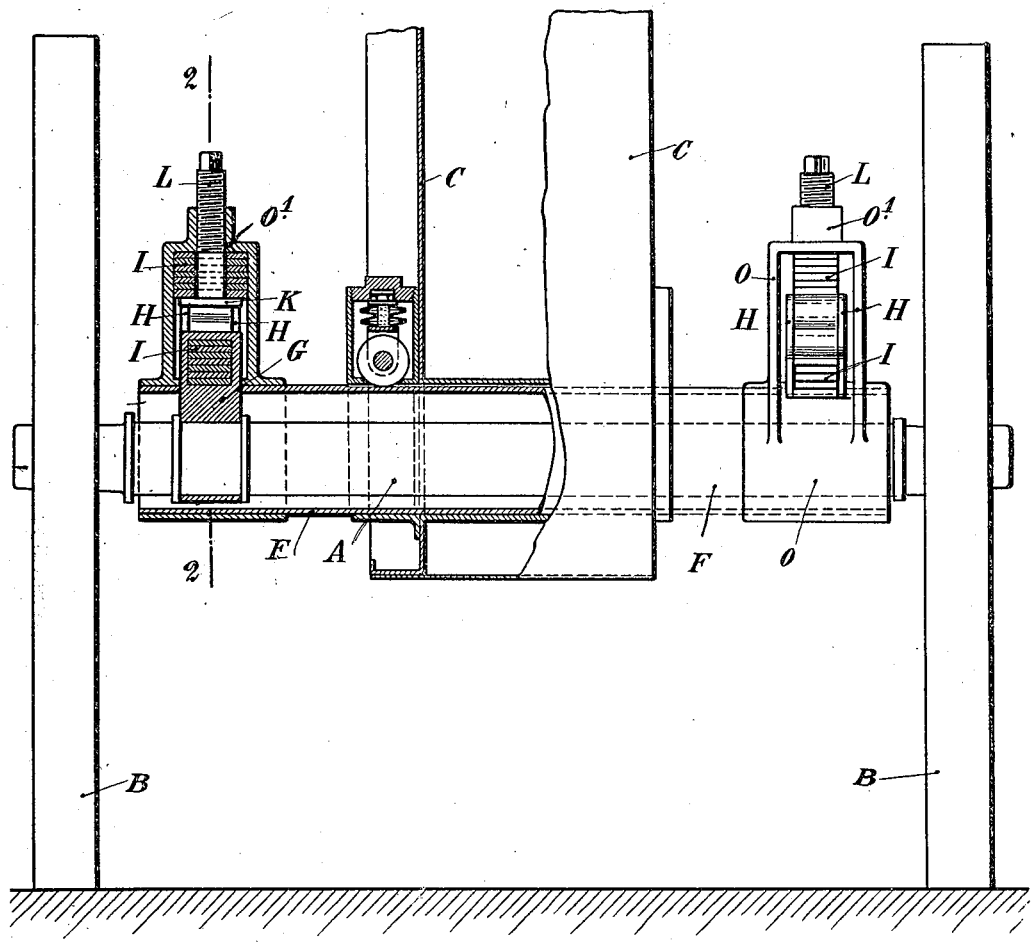
Figure 1 is a view, partly in elevation and partly in vertical section, of a constructional form of the invention.

According to this constructional form of the invention, the straight main axle A, in tubular form, is carried by the wheels B in the usual manner. Around the main axle is placed the auxiliary or false axle F also of tubular form. The interior diameter of the auxiliary axle is considerably greater than the exterior diameter of the main axle so that the former can have considerable transverse play in relation to the latter. Slidable laterally on the auxiliary axle is the gun carriage C, the latter being adjusted on the former by a screw (not disclosed herein, but fully shown in Figs. 2 and 4 of the parent case and described therein) journaled in the carriage and engaging a nut on the auxiliary axle.

Interposed between the main and auxiliary axles at each end thereof is the leaf spring I, the upper and lower bows of which are connected by the links H. The lower bow of the spring is mounted in the upper end of the block G seated at its lower end on the main axle between collars thereon to prevent movement of the block longitudinally of the axle. The block extends upwardly from the main axle through the wall of the auxiliary axle, having free vertical play therein. As the block is held against longitudinal movement on the main axle, it, in turn, holds the auxiliary axle against such movement and acts as a guide for the two axles in their relative vertical movement. The upper bow of the spring I is seated in the upper end of the stirrup or housing O extending downward on opposite sides of the block G and encircling at its lower end the auxiliary axle. In this way, the two springs I are interposed between the two axles to support the load of the carriage in elastic suspension so that the jars and jolts imparted to the wheels B in traveling over a rough road will be absorbed by the springs and not transmitted to the carriage.

Turned into the head O' of each housing O is the vertical screw L passing through the upper bow of the spring I and carrying at the lower end the plate K. By turning the screw into the housing, the plate K can be forced down onto the top of the block G. With the plates K so positioned, rigid bearings are formed between the two axles so that in firing the shock of discharge will be transmitted from the carriage C through the auxiliary axle F, the housings O, the screws L, the plates K and the blocks G to the main axle A without the interposition of the springs I.

In placing the gun for firing, the tail of the carriage trail (not shown) is pivoted to the ground in the usual manner. Preliminarily to firing the bolts L are turnd down to force the plates K onto the blocks G carried by the main axle A to form a direct bearing between the carriage and the main axle and thereby relieve the springs of the load. In training the gun, the head of the carriage is moved along the auxiliary axle F to the desired position. During this adjustment of the carriage head, the carriage, as a whole, pivots on the anchored tail of the trail. As the gun is so trained, the movement of the carriage head along the auxiliary axle will cause a slight shifting in the position of the main axle relatively to the trail pivot and the supporting wheels B will turn slightly to accommodate this shifting of the main axle. Preliminarily to transport, the carriage head is moved to midway position on the auxiliary axle and the bolts L are turned upward in their housings to raise the plates K from the blocks G, thereby interposing the springs I between the two axles to carry the load.

What is claimed is:

1. In a gun mounting, a wheeled main axle, a tubular auxiliary axle around the main axle having vertical play in relation to the same, a carriage slidable along the auxiliary axle for training the gun, and spring mechanism interposed between the two axles to carry the load of the carriage during transport.

2. In a gun mounting, a wheeled main axle, a tubular auxiliary axle around the main axle having vertical play in relation to the same, a carriage slidable along the auxiliary axle to train the gun, spring mechanism interposed between the two axles to carry the load of the carriage during transport, and adjustable means for forming a direct bearing for the auxiliary axle on the main axle to relieve the spring mechanism of the load of the carriage during firing and to transmit the shock of discharge from the carriage directly to the main axle.

3. In a gun mounting, a tubular wheeled main axle, a tubular auxiliary axle around the main axle, the interior diameter of the auxiliary axle being greater than the exterior diameter of the main axle to permit relatively transverse movement between the two axles, a carriage slidable along the auxiliary axle for training the gun, and spring mechanism interposed between the two axles to carry the load of the carriage during transport.

4. In a gun mounting, a tubular wheeled main axle, a tubular auxiliary axle around the main axle, the interior diameter of the auxiliary axle being greater than the exterior diameter of the main axle to permit relatively transverse movement between the two axles, a carriage slidable along the auxiliary axle for training the gun, spring mechanism interposed between the two axles to carry the load of the carriage during transport, and adjustable means for forming a direct bearing for the auxiliary axle on the main axle to relieve the spring mechanism of the load of the carriage during firing and to transmit the shock of discharge from the carriage directly to the main axle.

5. In a gun mounting, a wheeled main axle, a tubular auxiliary axle around the main axle having vertical play in relation to the same, a carriage slidable along the auxiliary axle for training the gun, a housing mounted on the auxiliary axle, a block seated on the main axle and projecting through the wall of the auxiliary axle to prevent relatively longitudinal movement of the two axles, and a spring interposed between the housing and the block to carry the load of the carriage during transport.

6. In a gun mounting, a wheeled main axle, a tubular auxiliary axle around the main axle having vertical play in relation to the same, a carriage slidable along the auxiliary axle for training the gun, a housing mounted on the auxiliary axle, a block seated on the main axle and projecting through the wall of the auxiliary axle to prevent relatively longitudinal movement of the two axles, a spring interposed between the housing and the block to carry the load of the carriage during transport, a bearing plate vertically movable in the housing, and a screw threaded in the housing for forcing the bearing plate onto the block to form a direct bearing between the two axles to relieve the spring of the load of the carriage during firing and to transmit the shock of discharge from the carriage directly to the main axle without the interposition of the spring.

In testimony whereof I have signed this specification.

EUGENE SCHNEIDER.

Witnesses:
 André Mosticker,
 Cyrus Edwards.